United States Patent [19]
Tanizawa et al.

[11] Patent Number: 5,743,829
[45] Date of Patent: Apr. 28, 1998

[54] CONTROL SYSTEM FOR VEHICLE AUTOMATIC TRANSMISSION

[75] Inventors: Shoichi Tanizawa; Masahide Saito; Satoru Sunada, all of Wako, Japan

[73] Assignee: Honda Giken Kogyo Kabushiki Kaisha, Tokyo, Japan

[21] Appl. No.: 600,635

[22] Filed: Feb. 13, 1996

[30] Foreign Application Priority Data

Feb. 22, 1995 [JP] Japan .................. 7-058018

[51] Int. Cl.$^6$ .................. F16H 61/14; F16H 59/06
[52] U.S. Cl. .................. 477/174; 477/175; 701/57; 701/68
[58] Field of Search .................. 477/166, 168, 477/169, 174, 175, 176, 180; 364/424.086, 424.096, 424.097; 701/68, 57

[56] References Cited

U.S. PATENT DOCUMENTS

| | | | |
|---|---|---|---|
| 5,095,435 | 3/1992 | Tokoro et al. | 364/424.097 |
| 5,267,158 | 11/1993 | Sakaguchi et al. | 364/424.097 |
| 5,627,750 | 5/1997 | Kono et al. | 477/176 |

FOREIGN PATENT DOCUMENTS 63-180757 A 7/1988 Japan .
06109122 A 4/1994 Japan .

*Primary Examiner*—Khoi Q. Tai
*Attorney, Agent, or Firm*—Armstrong, Westerman, Hattori, McLeland & Naughton

[57] ABSTRACT

A control system of a lockup clutch of a torque converter of a vehicle automatic transmission. A basic manipulated variable is determined in response to the vehicle operating condition in accordance with a predetermined characteristic, and the lockup clutch engaging force is controlled in response to the variable. In the system, fuzzy reasoning is carried out using the detected vehicle operating parameters to correct the basic manipulated variable, and the engaging force is controlled in response to the corrected manipulated variable, when the control condition is met. The corrected manipulated variable is gradually decreased with respect to time when the vehicle driving state has shifted from a region in which the engaging force is controlled in response to the corrected manipulated variable to a region in which the lockup clutch is disengaged. In addition, the corrected manipulated variable is gradually increased when the vehicle driving state has shifted from a region in which the lockup clutch is disengaged to a region in which the engaging force is controlled in response to the corrected manipulated variable.

7 Claims, 15 Drawing Sheets

5,743,829

1

CONTROL SYSTEM FOR VEHICLE AUTOMATIC TRANSMISSION

BACKGROUND OF THE INVENTION

1. Field of the Invention

This invention relates to a control system for a vehicle automatic transmission, more particularly to a control system for the lockup clutch of a torque converter of a vehicle automatic transmission.

2. Description of the Prior Art

Automatic transmissions are usually designed to automatically select the optimum gear by detecting vehicle or engine speed and the degree of throttle opening or some other such parameter indicating engine load and then retrieving a gear by the detected values of these parameters from gear shift characteristics (a shift map) determined in advance based on the same parameters.

In the automatic transmission of this type, a hydraulic torque converter equipped with a lockup clutch is installed between the internal combustion engine (power source) and the transmission unit. The torque increase characteristic of the torque converter is utilized when the vehicle is accelerating, as during drive-away or overtaking, while the lockup clutch completely or partially engages the input and output sides of the hydraulic torque converter during cruising. The ON (operative) and OFF (inoperative) regions of the lockup clutch are defined in advance in terms of the gear (gear ratio) and other driving conditions and the lockup clutch is controlled based thereon to prevent transmission efficiency loss.

Because a type of surging known as body vibration may occur in the acceleration region when the operator steps down on the accelerator pedal, drivability considerations make it extremely difficult to optimize the ON/OFF characteristics of the lockup clutch. The prior art practice has therefore been to keep the lockup clutch normally OFF when in the acceleration region is entered owing to depression of the accelerator pedal or, more precisely, to define this region as a weak lockup region in which only a weak engagement determined from the characteristics of the hydraulic circuit is imparted. A description of this prior art technology can be found, for example, in Japanese Laid-Open Patent Application No. Sho 63(1988)-180,757.

The need to expand the ON (operative) region of the lockup clutch has heightened in recent years, however, owing to increased demand for lesser fuel consumption. The prior art cannot sufficiently respond to this requirement. On the other hand, the ON (operative) region cannot be indiscriminately broadened because, as just pointed out, this would lead to surging and degrade drivability.

An object of this invention is therefore to overcome the aforesaid problems by providing a control system for a vehicle automatic transmission which expands the ON (operative) region of the lockup clutch and achieves improved fuel efficiency while avoiding the occurrence of surging.

SUMMARY OF THE INVENTION

Another object of this invention is to provide a control system for a vehicle automatic transmission which expands the ON (operative) region of the lockup clutch and achieves improved fuel efficiency and which, contrary to what might be expected, simultaneously provides an improvement in drivability with regards to direct control feel and the response of vehicle speed to accelerator pedal depression in the acceleration region.

2

This invention achieves this object by providing a system for controlling an automatic transmission of a vehicle, comprising, coupling means (clutch means) having an input connected to an internal combustion engine mounted on the vehicle and an output connected to a gear system in the transmission, said coupling means passing engine power to the gear system, gear ratio establishing means for establishing a gear ratio of the gear system in response to a gear shift command to transmit the engine power to a vehicle wheel through the established gear ratio, engaging force control means for controlling the engaging force of the coupling means including at least an engaging state and a disengaging state, vehicle operating condition detecting means for detecting operating conditions of the vehicle, and basic manipulated variable determining means for determining a basic manipulated variable to be applied to said engaging means in response to a parameter of the detected vehicle operating conditions in accordance with a predetermined characteristic. In the system, said engaging force control means includes, fuzzy reasoning means for carrying out fuzzy reasoning using a parameter of the detected operating conditions of the vehicle to determine a correction value of the basic manipulated variable, and manipulated variable correcting means for correcting the basic manipulated variable based on the correction value. And in the system, said engaging force control means controls the engaging force of the coupling means in response to the corrected manipulated variable.

BRIEF EXPLANATION OF THE DRAWINGS

This and other objects and advantages of the invention will be more apparent from the following description and drawings, in which.

DETAILED DESCRIPTION OF THE PREFERRED EMBODIMENTS

An embodiment of the invention will now be explained with reference to the attached drawings.

Figure 1:
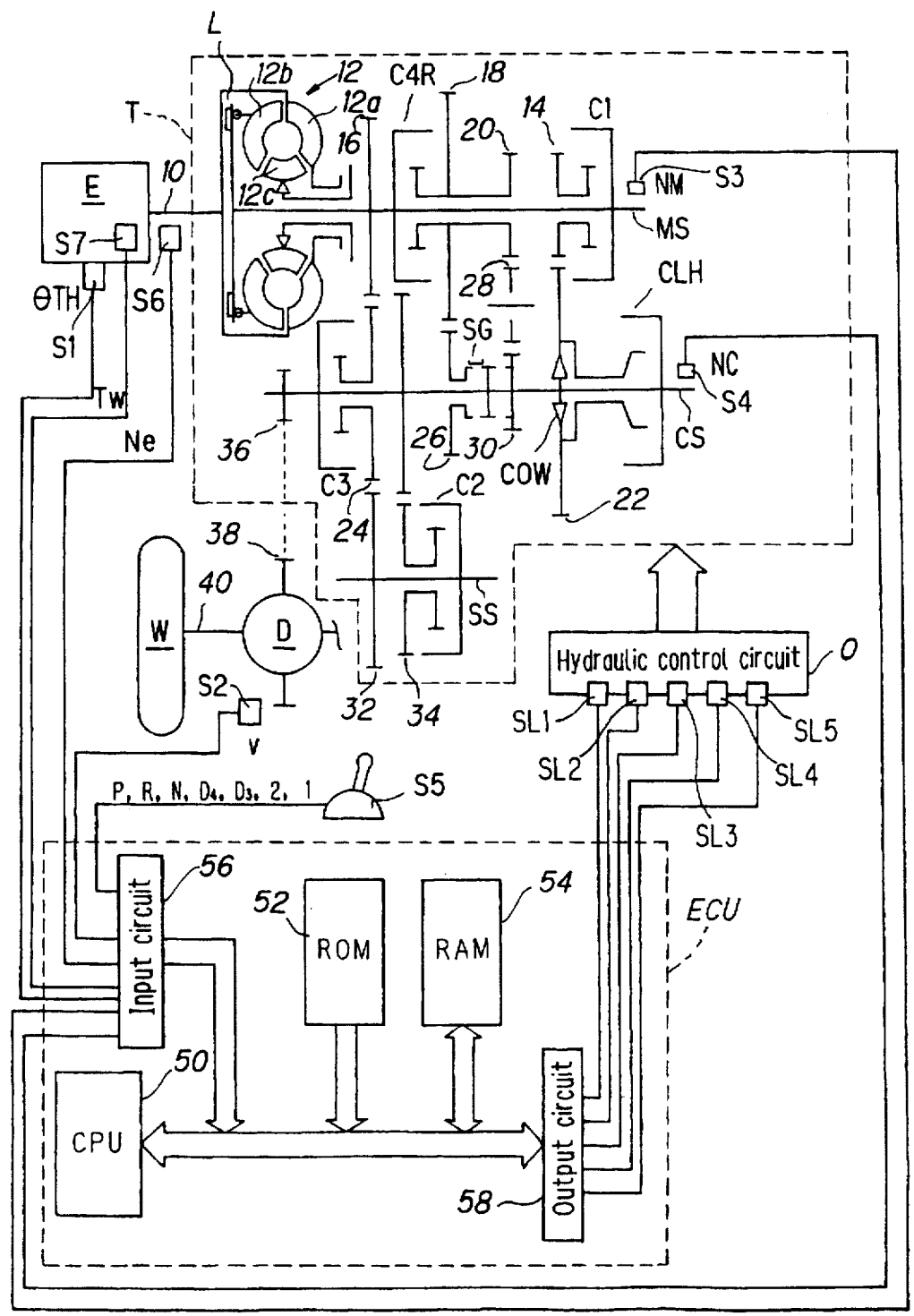
FIG. 1 is an overall schematic view showing the configuration of a control system for a vehicle automatic transmission.

FIG. 1 is an overall view of a control system for a vehicle automatic transmission according to the invention.

As shown in FIG. 1, a crankshaft 10 of an internal combustion engine E is connected with a main shaft MS, through a hydraulic torque converter (hydraulic coupling means) 12 having a lockup clutch L (coupling means), of a vehicle automatic transmission T. The automatic transmission T has a gear system made up of the main shaft MS, a countershaft CS and a secondary shaft SS which are arranged in parallel and support gears thereon.

More specifically, the main shaft MS supports a main first-speed gear 14, a main third-speed gear 16, a main fourth-speed gear 18 and a main reverse gear 20. The countershaft CS supports a counter first-speed gear 22 engaged with the main first-speed gear 14, a counter third-speed gear 24 engaged with the main third-speed gear 16, a counter fourth-speed gear 26 engaged with the main fourth-speed gear 18 and a counter reverse gear 30 engaged with the main reverse gear 20 through a reverse idle gear 28. The secondary shaft SS supports a first secondary second-speed gear 32 and a second secondary second-speed gear 34.

The first gear is established when the main first-speed gear 14 rotatably supported on the main shaft MS is connected with the main shaft MS by a first-speed hydraulic clutch C1. Since the first-speed hydraulic clutch C1 is also maintained in the engaged state during establishment of the second-fourth gears, the counter first-speed gear 22 is supported by a one-way clutch COW. A hydraulic clutch CLH is provided for holding the first gear so as to ensure that the driven wheels W drive the engine E, i.e., to ensure the engine braking effect when 1st or 2nd range (explained later) is selected.

The second gear is established, through the main third-speed gear 16, the counter third-speed gear 24 and the first secondary second-speed gear 32, when the second secondary second-speed gear 34 rotatably supported on the secondary shaft SS is connected with the secondary shaft SS by a second-speed hydraulic clutch C2. The third gear is established when the counter third-speed gear 24 rotatably supported on the countershaft CS is connected with the countershaft CS by a third-speed hydraulic clutch C3.

The fourth gear is established when the counter fourth-speed gear 26 rotatably supported on the countershaft CS is connected with the countershaft CS by a selector gear SG and with this state maintained the main fourth-speed gear 18 rotatably supported on the main shaft MS is connected with the main shaft MS by a fourth-speed/reverse hydraulic clutch C4R. The reverse gear is established when the counter reverse gear 30 rotatably supported on the countershaft CS is connected with the countershaft CS by the selector gear SG and with this state maintained the main reverse gear 20 rotatably supported on the main shaft MS is connected with the main shaft MS by the fourth-speed/reverse hydraulic clutch C4R.

The rotation of the countershaft CS is transmitted through a final drive gear 36 and a final driven gear 38, engaged therewith, to a differential D, from where it is transmitted to the driven wheels W through left and right drive shafts 40 (only one shown).

A throttle position sensor S1 is provided in an air intake pipe (not shown) of the engine E at a point in the vicinity of a throttle valve (not shown) for detecting the degree of opening or position θTH of the throttle valve. A vehicle speed sensor S2 for detecting the vehicle traveling speed V from the rotational speed of the final driven gear 38 is provided in the vicinity of the final driven gear 38. A transmission input shaft speed sensor S3 is provided in the vicinity of the main shaft MS for detecting the rotational speed NM of the transmission input shaft from the rotation of the main shaft MS, and a transmission output shaft speed sensor S4 is provided in the vicinity of the countershaft CS for detecting the rotational speed NC of the transmission output shaft from the rotation of the countershaft CS.

A shift lever position sensor S5 is provided in the vicinity of a shift lever (not shown) installed on the vehicle floor near the driver's seat. The shift lever position sensor S5 detects which of the seven ranges or positions P, R, N, D4, D3, 2, 1 has been selected by the driver. A crank angle sensor S6 is provided in the vicinity of the crankshaft 10 of the engine E for detecting the engine speed Ne from the rotation of the crankshaft 10, and a coolant temperature sensor S7 for detecting the engine coolant temperature Tw is provided at an appropriate location on a cylinder block (not shown) of the engine E. Outputs of the sensors S1, etc., are sent to an ECU (electronic control unit).

The ECU is constituted as a microcomputer comprising a CPU (central processing unit) 50, a ROM (read-only memory) 52, a RAM (random access memory) 54, an input circuit 56 and an output circuit 58. The outputs of the sensors S1, etc., are input to the microcomputer through the input circuit 56. The CPU 50 of the microcomputer conducts gear shift control including the lockup clutch control and issues a command to a hydraulic control circuit O via the output circuit 58.

The hydraulic control circuit O has shift solenoids SL1, SL2, an ON/OFF control solenoid SL3 and a capacity (engaging force) control solenoid SL4 for the lockup clutch L, and a linear solenoid SL5 for regulating clutch oil pressure. More specifically, the CPU 50 determines the shift position (gear ratio) based on the outputs of the sensors and energizes/deenergizes the shift solenoids SL1, SL2 of the hydraulic control circuit O via the output circuit 58 so as to switch shift valves (not shown) and thereby engage/disengage the hydraulic clutches of prescribed gears. As will be explained later, it also controls the lockup clutch in the ON (fully engaged or operative) state, or in the OFF (fully disengaged or inoperative) state, or in a partially engaged or slip-controlled state between these two states such that the torque converter 12 is slip-engaged.

The torque converter 12 comprises a pump 12a connected to the crankshaft 10, a turbine 12b connected to the main shaft MS, a stator 12c and the lockup clutch L. The lockup clutch L is of the known configuration comprising a lockup piston, a damper spring, etc. Depending on the amount of oil pressure supplied to its left and right chambers, the lockup clutch assumes the ON state (shown by solid lines in FIG. 2 discussed below), the OFF state (shown by phantom lines in FIG. 2) or the slip-controlled state.

When the lockup clutch is ON, the power of the engine E is transmitted to the main shaft MS through a drive plate, a torque converter cover and the lockup clutch L. When the lockup clutch is OFF, the engine power is transmitted to the main shaft MS through the drive plate, the torque converter cover, the pump 12a and the turbine 12b.

Figure 2:
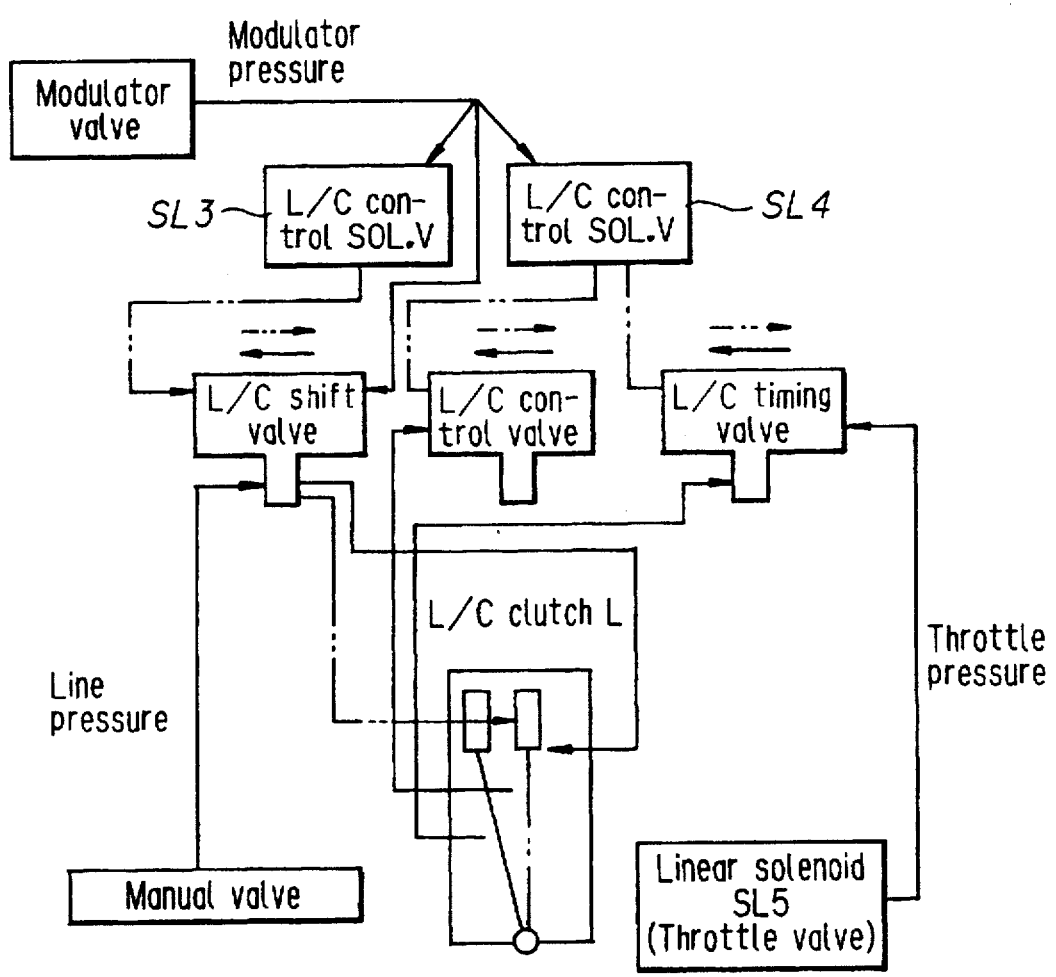
FIG. 2 is a block diagram showing a hydraulic control of a lockup clutch illustrated in FIG. 1.

FIG. 2 is a block diagram functionally illustrating the hydraulic operation of the lockup clutch L. The lockup clutch is turned ON and OFF by supplying or not supplying line pressure from a manual valve to a lockup shift valve which receives modulator pressure from a modulator valve through the solenoid SL3. An L/C (lockup) control valve which receives the modulator pressure (through the solenoid SL4) controls the engaging force of the lockup clutch L by regulating the oil pressure supplied to the right chamber of the clutch. The torque converter 12 is thus controlled to the aforesaid completely locked-up (fully-engaged or ON) state by an L/C (lockup) timing valve which receives throttle pressure through the linear solenoid (throttle valve) SL5 and the modulator pressure (through the solenoid SL4).

Figure 3:
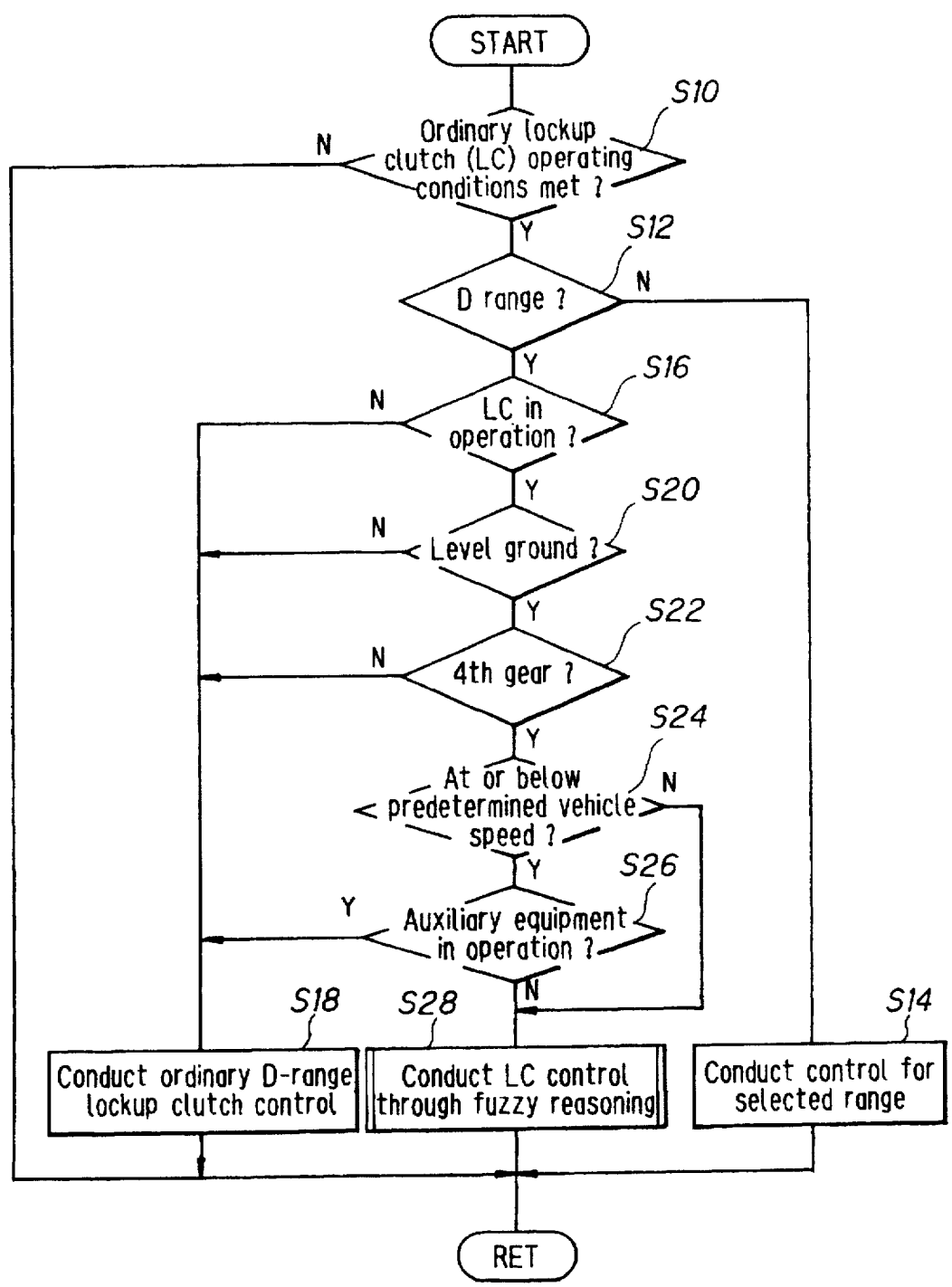
FIG. 3 is a flowchart showing the operation of the system according to the invention.
Figure 4:
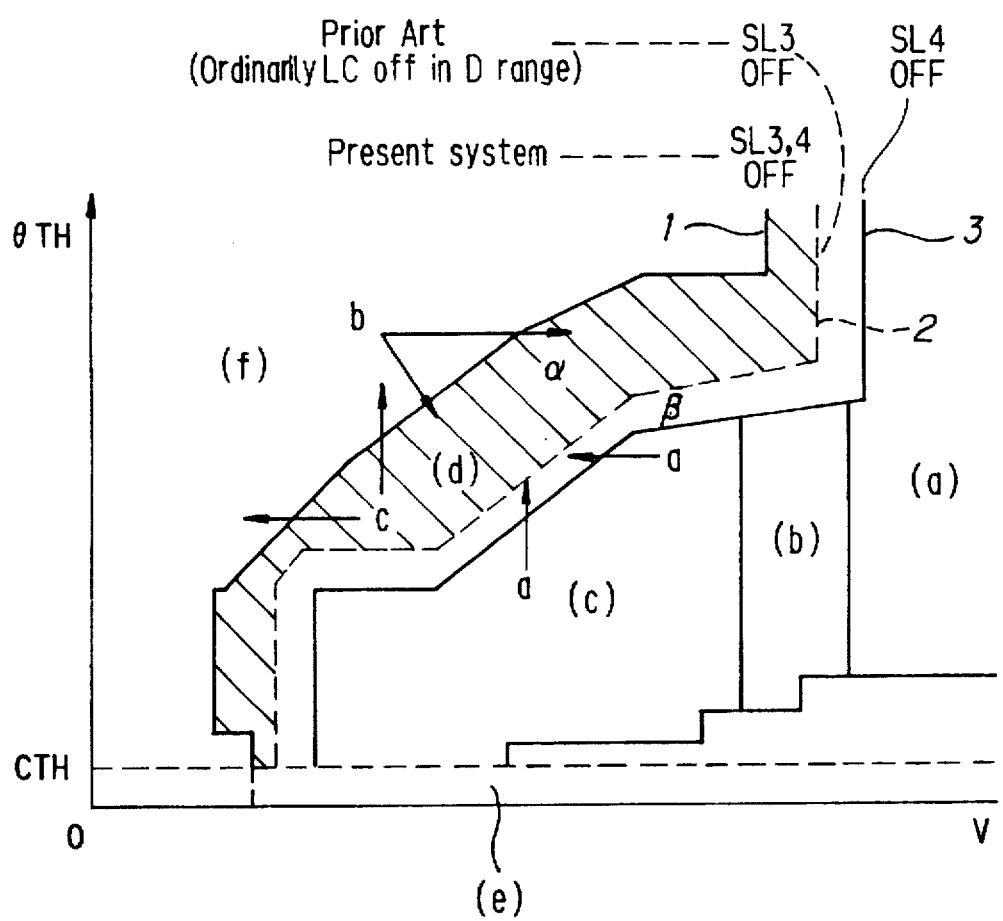
FIG. 4 is a graph showing operational regions of the lockup clutch illustrated in FIG. 1.

FIG. 3 is a flowchart of the operations of a control system for a vehicle transmission according to this invention. Prior to going into the details of this flowchart, however, a background explanation will first be given with reference to FIG. 4 regarding the lockup clutch operating characteristics (hereinafter referred to as the LC map) in the invention system. The characteristics shown in FIG. 4 are defined relative to throttle opening θTH and vehicle speed V.

The reference symbols 1, 2 and 3 in this figure designate the switchover lines of the aforesaid solenoid SL3 and solenoid SL4. To the right of line 3 in this figure, the solenoid SL3, which conducts two position (engagement/disengagement) control of the lockup clutch, and the solenoid SL4, which controls the engaging force therebetween based on the desired slip ratio of the torque converter, are both ON. In the control of the engaging force, the duty value (PWM duty value or ratio) applied to the solenoid SL4 as the manipulated variable is calculated based on the desired slip ratio (amount) of the torque converter.

More specifically, on the right side of the figure the region (a) is a completely locked-up region in which a duty value of 100% is applied to the solenoid SL4 for directly connecting the input and output sides of the torque converter. The region (b) is a strong lockup region in which the duty value of the solenoid SL4 is increased from the value in the adjacent region toward 100% in prescribed increments so as to gradually increase the engaging force and decrease the slip ratio. The region (c) is a region of relatively stable driving conditions involving little fluctuation in engine speed. In this region, the duty value for obtaining the desired slip ratio is learned by using a PI controller to conduct feedback control based on the error between the desired slip ratio and the actual slip ratio.

The region (d) comprises a hatched portion α and a region β lying outside the hatched portion. In the prior art systems, the solenoid SL4 is turned OFF in the region β outside the hatched portion and the lockup clutch is turned OFF in hatched portion α. In the invention, on the other hand, the solenoid SL4 is left ON in the region (d) and the engaging force is duty-controlled (PWM controlled). As a specific example of prior-art system operation, take the case where, as indicated by the arrows a in FIG. 4, the operating state moves from the region (c) or the like, across the line 3 and into the region β outside the hatched portion of the region (d) owing to a decrease in the vehicle speed V or an increase in the throttle opening θTH. In this case, the solenoid SL3 remains ON, but since the solenoid SL4 is turned OFF, the lockup clutch is applied with only the minimum capacity determined from the characteristics of the hydraulic circuit, so that only the weak engaging force at this lower limit is applied. Then when the operating state moves across the line 2, the solenoid SL3 is turned OFF and the lockup clutch becomes inoperative.

Thus the prior art systems cope with the risk that even a slight variation in throttle opening may lead to surging in the region (d) by limiting the engaging force to not more than that dictated by the system hardware. In contrast, this invention enables the engaging force to be increased by determining the duty value through fuzzy reasoning in the manner described hereinafter.

The region (e) is a deceleration lockup region. Since variation in the torque from the engine E is not a problem in this region, feedback control employing a PI controller is controlled for obtaining the duty value needed to secure the desired slip ratio of the torque converter (=NM/Ne×100%; explained later), namely, a slip ratio in the range of 102 to 103%, thereby ensuring a good engine braking effect. In the region (f), the lockup clutch is disengaged, in both the prior art and the invention.

The operation of the invention system will now be explained with reference to the flowchart of FIG. 3, taking as an example the case where the operating state passes over the line 3 from the right as indicated by the arrows a in FIG. 4. The routine of FIG. 3 is actuated at appropriate time intervals of, for example, 20 ms.

First, in S10, it is checked whether the ordinary lockup clutch (LC) operating conditions are met. Specifically, it is checked whether the engine coolant temperature Tw, engine speed Ne, vehicle speed V and throttle opening θTH are within prescribed ranges and that system failure has not occurred.

When the result in S10 is NO, the routine is immediately terminated. When it is YES, the program goes to S12, in which it is checked whether the selected range is D. When it is not, the program goes to S14, in which control for the selected range is conducted, and when it is, it goes to S16, in which it is checked whether the lockup clutch is in operation (ON state). In other words, it is confirmed whether the operating state is moving in the direction of the arrows a in FIG. 4, not in the direction of the arrows b.

This step is necessary because structural (hardware) differences between different lockup clutches, including their hydraulic circuits, make it impossible to achieve the desired torque converter slip ratio even if fine engaging force control is started immediately after the lockup clutch has been disengaged. Conversely, good control performance can be obtained when the lockup clutch is in operation, namely, when the solenoids SL3 and SL4 are ON.

More specifically, the general tendency is for the engaging force of the lockup clutch and the slip ratio of the torque converter to decrease as the operating state moves from right to left in FIG. 4, and the control performance is better in the direction of decreasing engaging force and slip ratio. When the result in S16 is NO, therefore, the program goes to S18, in which ordinary D-range lockup clutch control is conducted. Specifically, SL4 is turned OFF and weak lockup control determined by the hardware is conducted.

On the other hand, when the result in S16 is YES, the program moves to S20, in which it is checked whether the vehicle is currently traveling over level ground. This step is conducted because the driven wheels W may drive the engine E depending on the slope of an uphill or downhill grade, and it affects the torque converter slip ratio and the lockup clutch engaging force and makes the probability of surging occurrence high.

Discrimination of whether the road is level can be conducted by using an inclination sensor mounted at an appropriate location on the vehicle or by adopting the technique taught by the assignee's Japanese Laid-Open Patent Application No. Hei 6(1994)-109,122 (filed in the United States and patented under the number of U.S. Pat. No. 5,317,937) of using an index indicative of the running resistance calculated from the vehicle acceleration to select from multiple maps for level-road driving, hill-climbing, etc., prepared in advance and making the discrimination based on whether or not an LC map for level-road driving is selected.

When the result in S20 is NO, the program goes to S18, in which control is conducted in the same manner as in the prior art, and when it is YES, the program goes to S22, in which it is checked whether the current gear (speed) is fourth gear. This step is conducted because a margin for surging is greater for a higher gear (smaller gear ratio) in the D range. When the result in S22 is NO, the program goes to S18, in which control is conducted in the same manner as in the prior art, and when it is YES, the program goes to S24, in which it is checked whether the current vehicle speed V is at or below a predetermined speed of, for instance, 50 km/h. When the result in S24 is YES, the program goes to S26, in which it is checked whether any auxiliary equipment is in operation. By "auxiliary equipment" is meant an air conditioner or other such equipment driven by the output (power) of the engine E.

When the result in S26 is YES, the program goes to S18, in which control is conducted in the same manner as in the prior art, and when it is NO, the program goes to S28, in which lockup clutch control is conducted using fuzzy reasoning (approximate reasoning). This method is adopted because the operation of auxiliary equipment at or below the predetermined speed strongly affects the engine output and the rotational speed on the input side of the torque converter 12, making appropriate slip control of the lockup clutch difficult. When S24 finds that the current vehicle speed is greater than the predetermined speed, the risk of fluctuation in the engine output and the rotational speed on the input side of the torque converter 12 can be assumed to be low. Since the slip control is therefore not likely to be affected, the program skips S26 and goes directly to S28.

Figure 5:
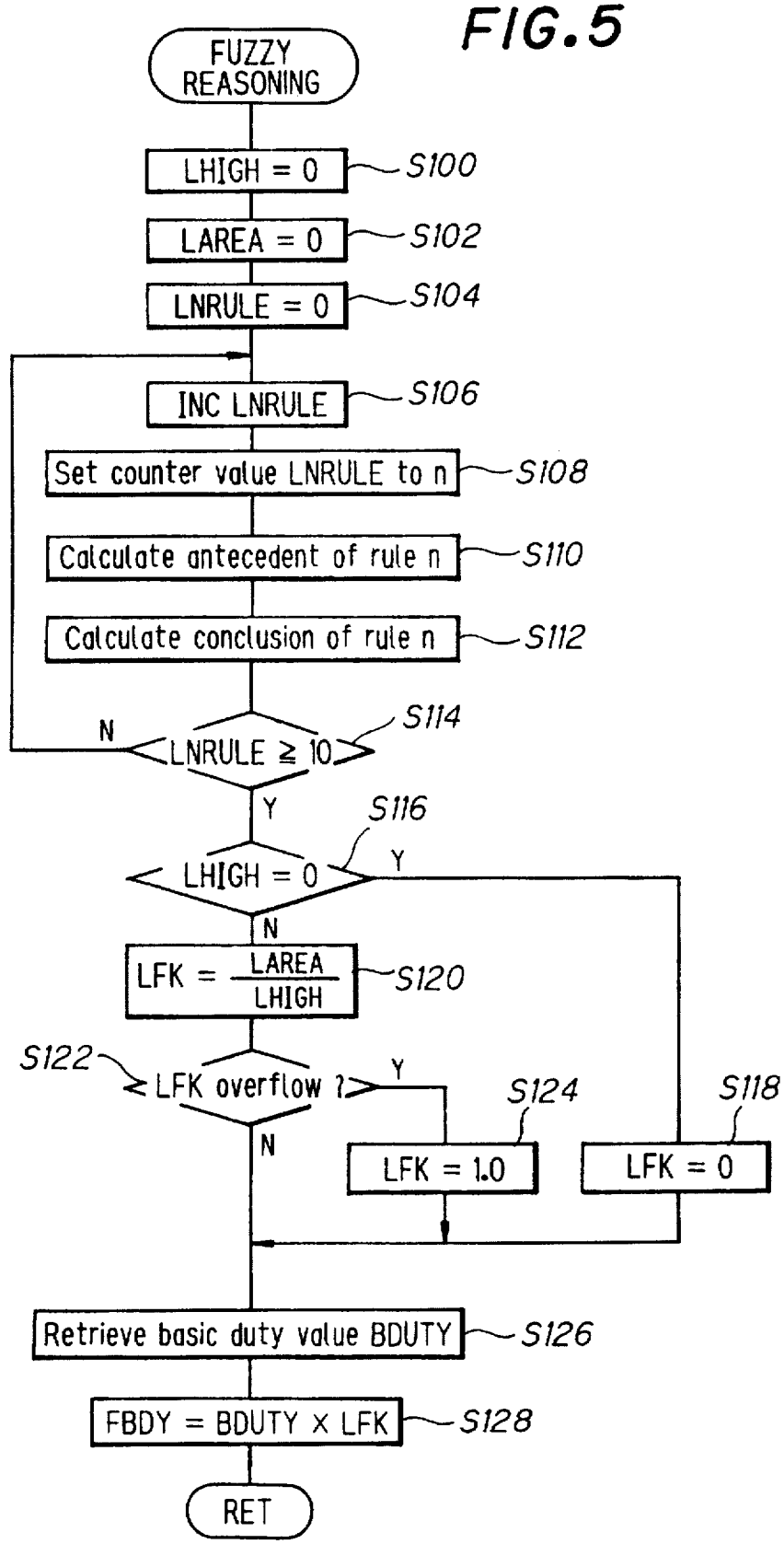
FIG. 5 is a subroutine of the FIG. 3 flowchart showing the determination of a manipulated variable to be applied to the lockup clutch through fuzzy reasoning.
Figure 6:
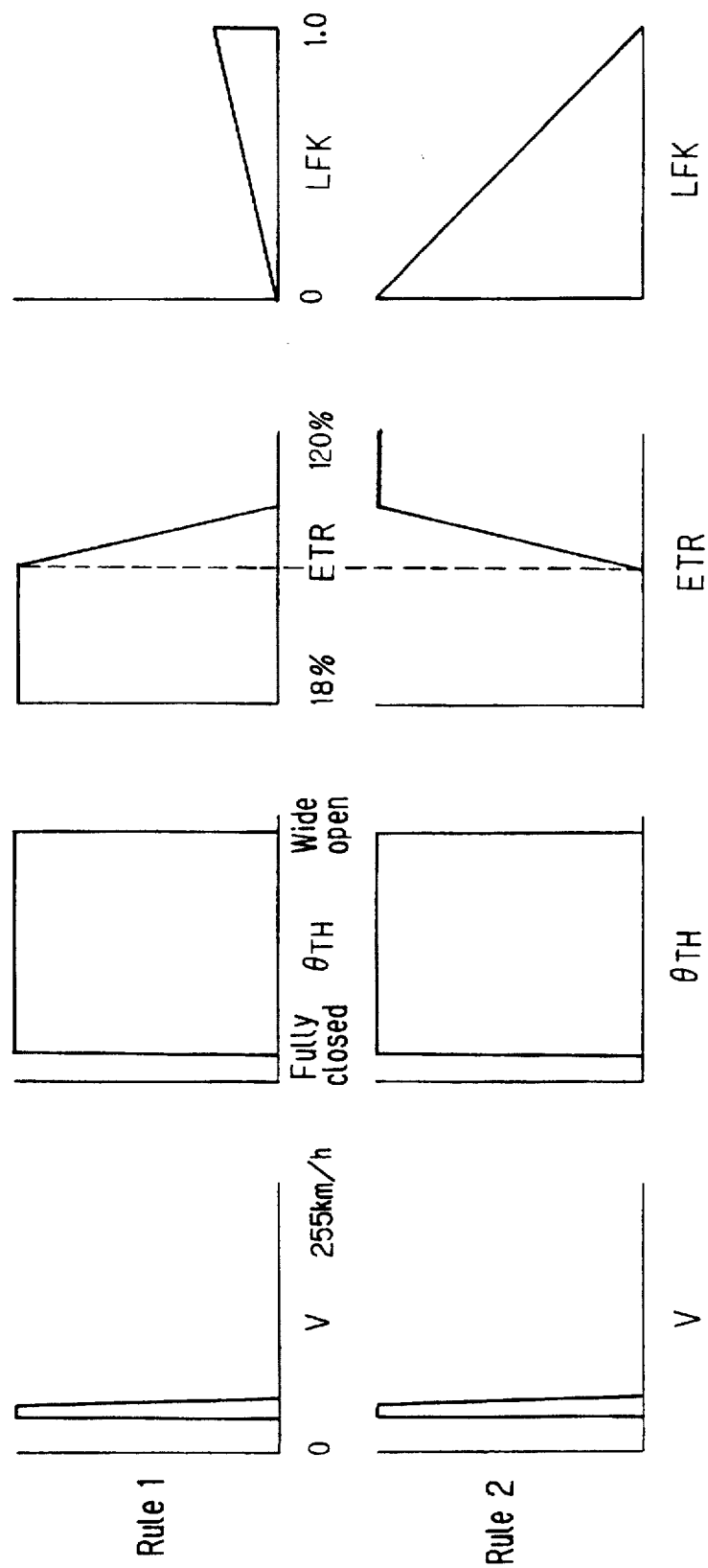
FIGS. 6 to 10 are explanatory views showing fuzzy production rules used in the fuzzy reasoning of FIG. 5.
Figure 7:
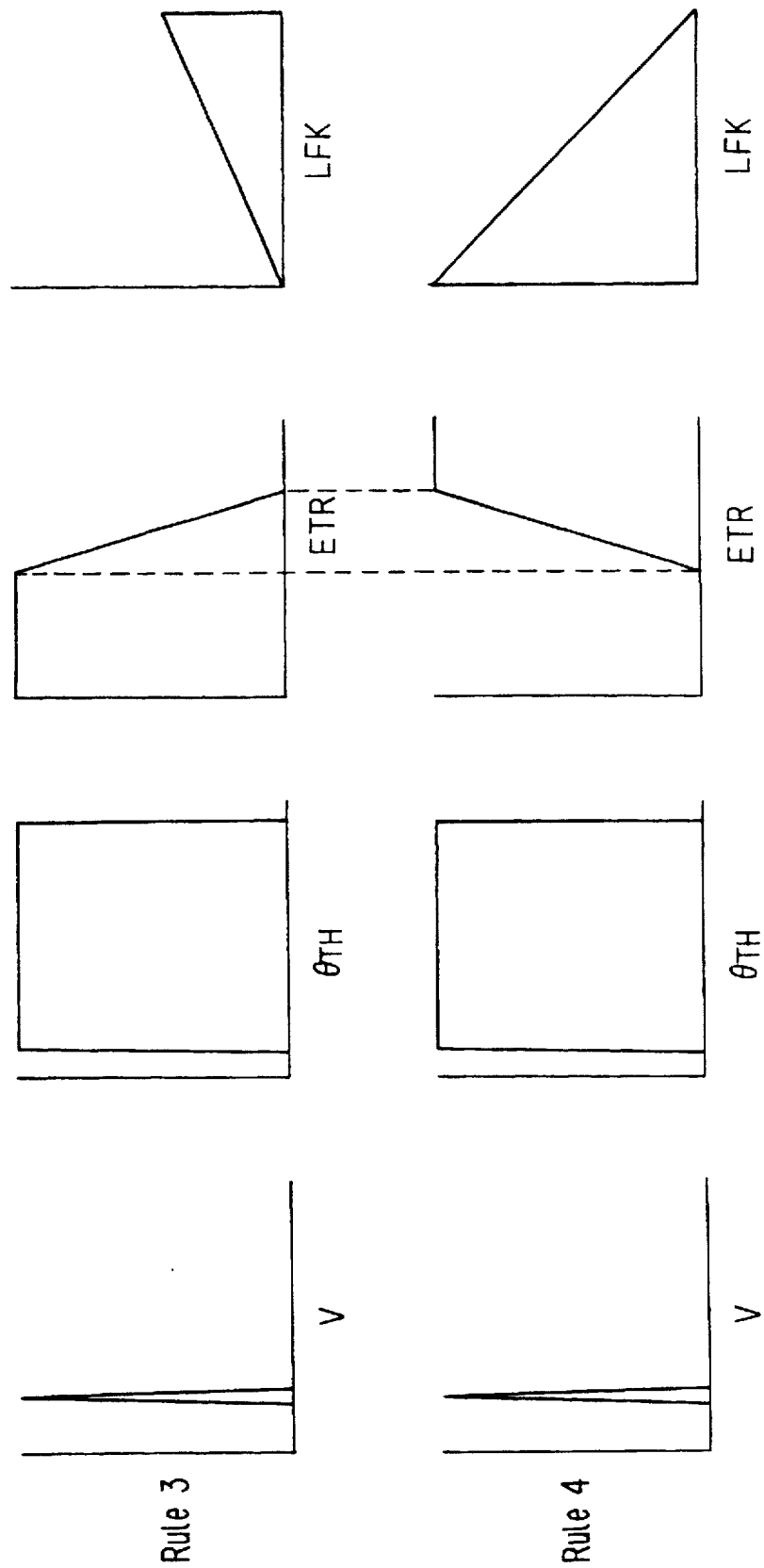
Figure 8:
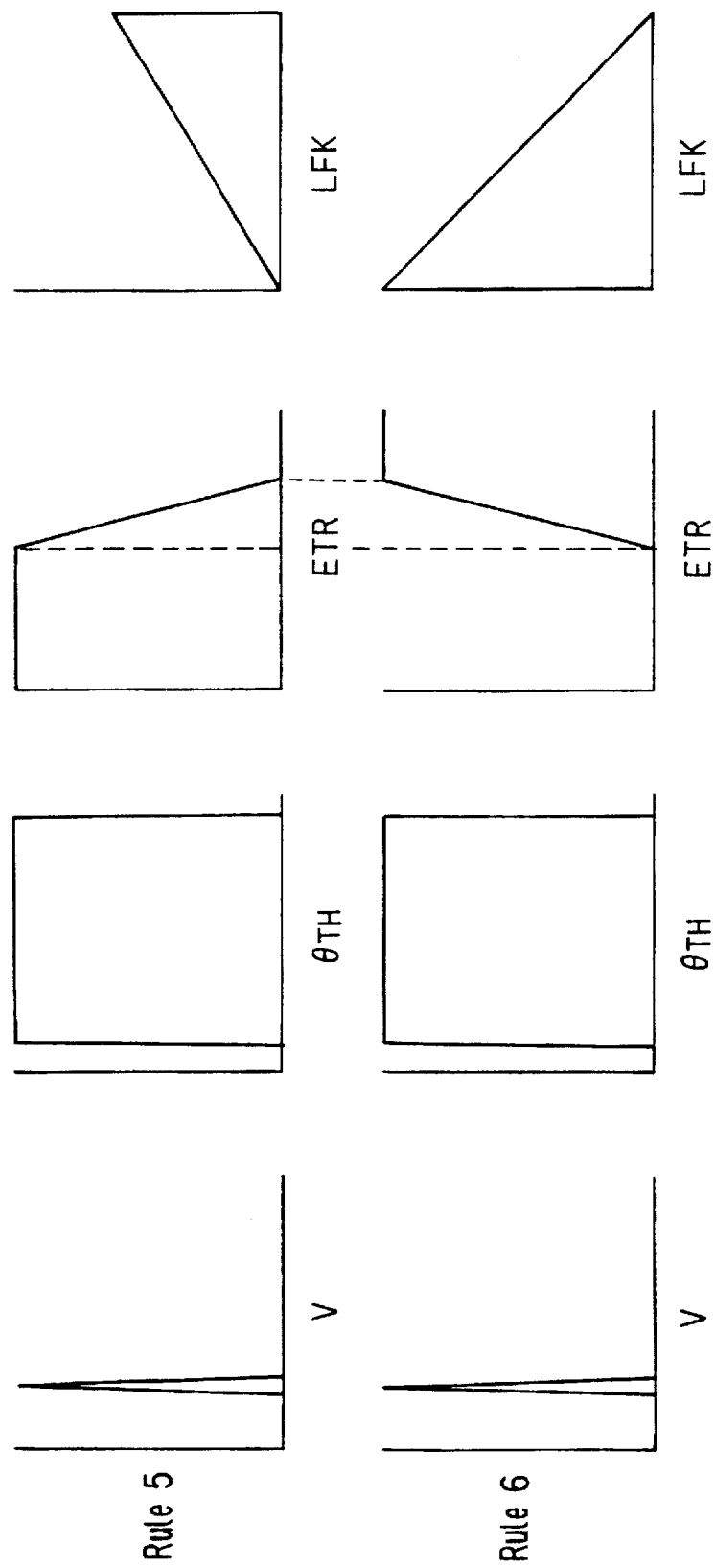
Figure 9:
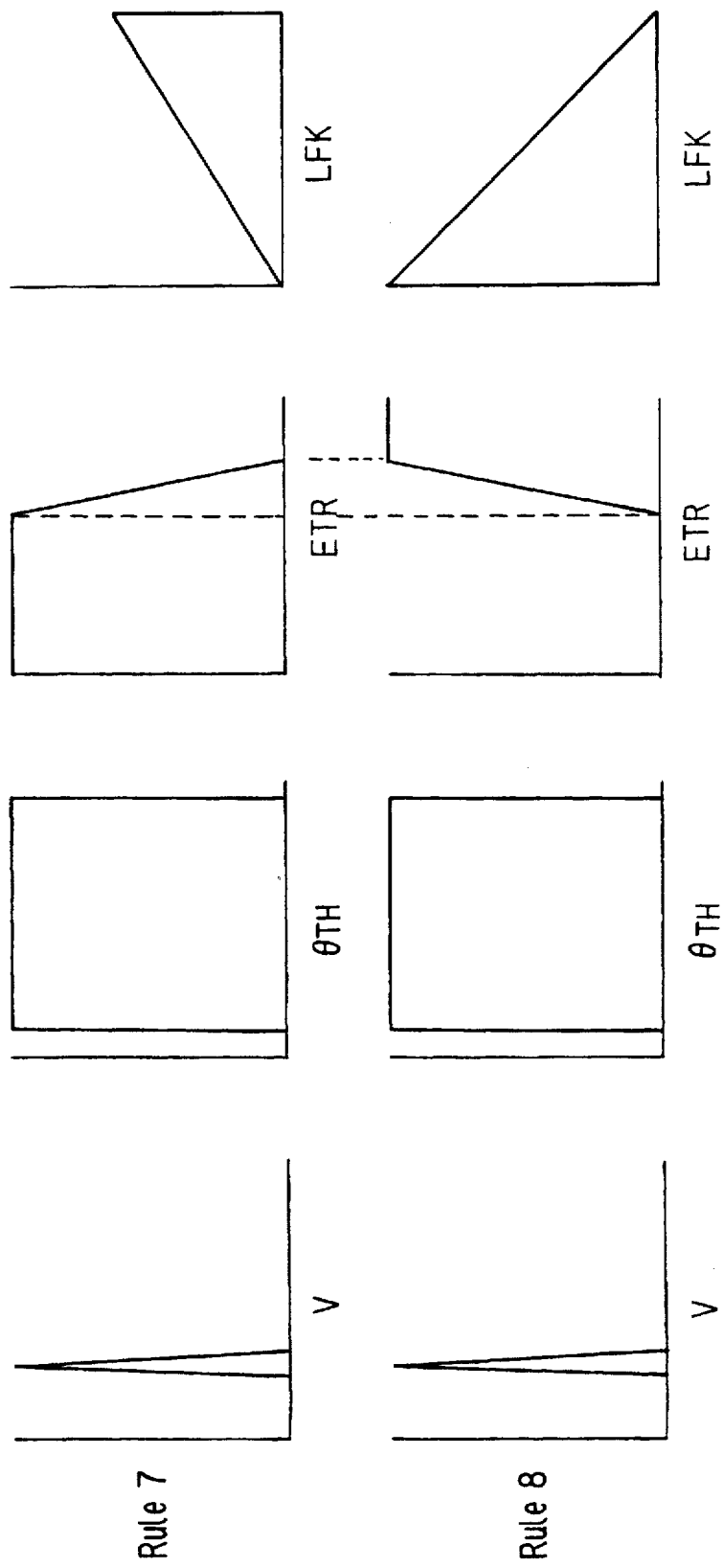
Figure 10:
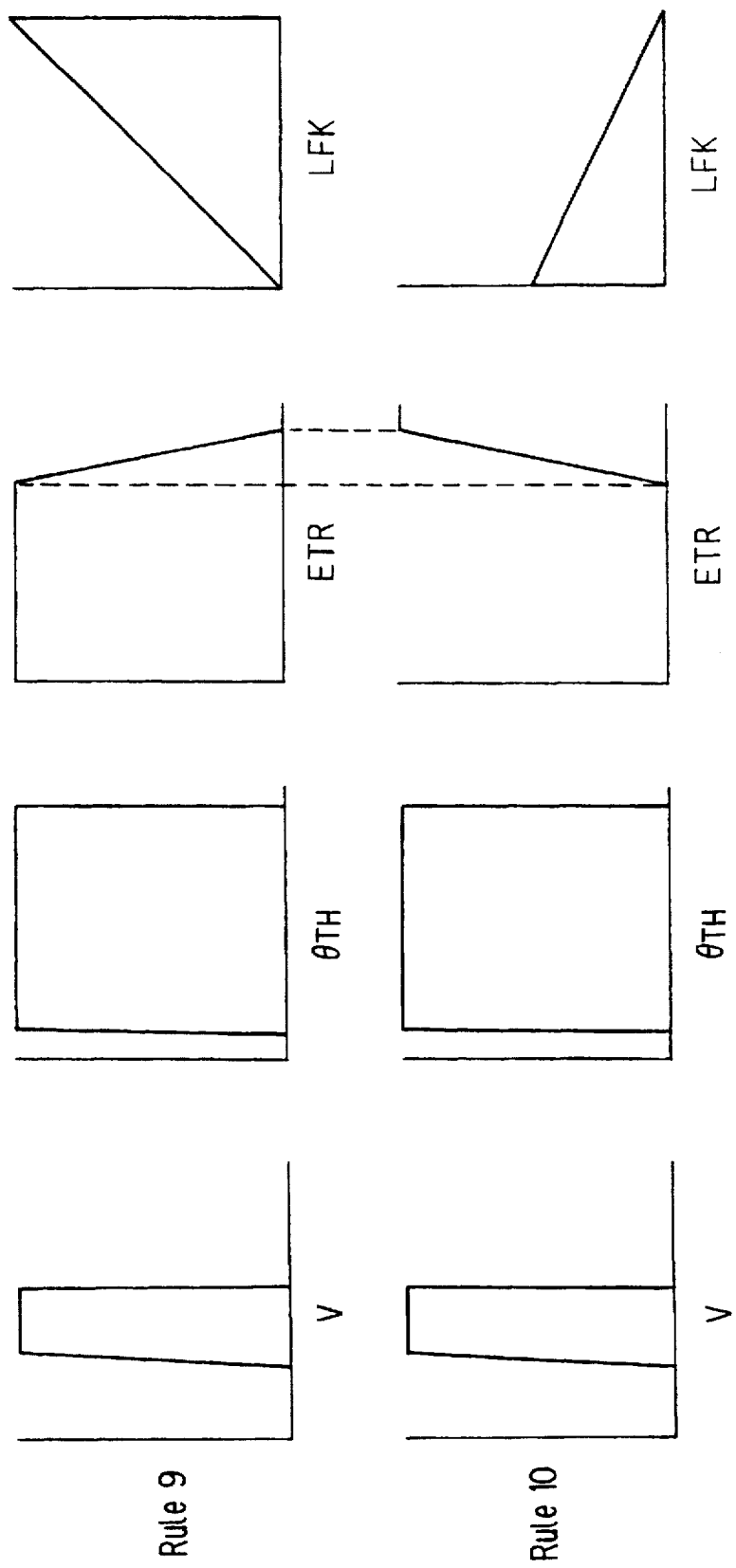

FIG. 5 is the flowchart of a subroutine for determining the manipulated variable for the lockup clutch control using fuzzy reasoning, and FIGS. 6 to 10 are diagrams for illustrating fuzzy production rules used in the fuzzy reasoning.

As shown in FIGS. 6 to 10, the fuzzy reasoning uses ten rules whose antecedents include as parameters the vehicle speed V, the throttle opening $\theta TH$ and the torque converter slip ratio ETR. As shown in the figures, membership functions are defined within the ranges of a vehicle speed V between 0 and 255 km/h, a throttle opening $\theta TH$ between fully closed and wide open, and a torque converter slip ratio ETR between 18 and 120%.

The slip ratio ETR of a torque converter is ordinarily calculated as (rotational speed of turbine input shaft)/(rotational speed of pump input shaft). In this embodiment, however, it is calculated as (rotational speed of main shaft NM)/(rotational speed of engine Ne)×100%. (The upper limit of 120% is set in consideration of the engine braking effect.)

The parameter of the conclusion is a correction coefficient (correction coefficient LFK) for correcting the basic duty value (basic manipulated variable). As illustrated, the membership function is set between 0 and 1.0. The basic duty value (indicated as BDUTY in FIG. 5 etc.) is established as a table (based on the characteristic curve shown in FIG. 11) and is a value defining the upper limit of the duty value output to the solenoid SL4 as a function of engine load (throttle opening $\theta TH$). In other words, the correction coefficient LFK is obtained by fuzzy reasoning using the vehicle speed V or the like and the basic duty value BDUTY is multiplied thereby to obtain the corrected duty value (duty value FBDY) to be output to the solenoid SL4 as the control input.

Figure 11:
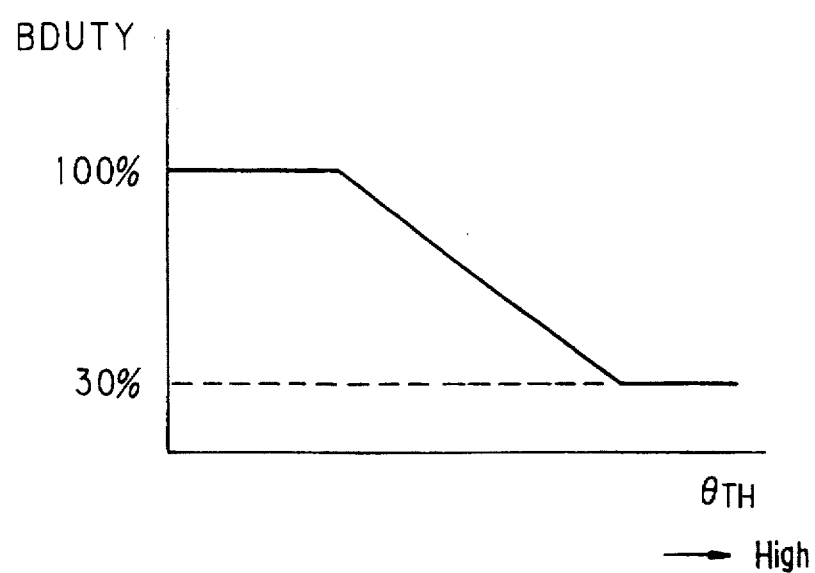
FIG. 11 is a graph showing the characteristic of a basic duty value BDUTY (basic manipulated variable) used in the procedure of FIG. 5.

As shown by the characteristic curve of FIG. 11, the basic duty value is defined to decrease with increasing engine load (throttle opening $\theta TH$). Needless to say, the purpose of this is to counteract the higher probability of surging with increasing throttle opening by reducing the duty value and thus lowering the engaging force of the lockup clutch.

Among the rules shown in FIGS. 6 to 10, rules 1 and 2, 3 and 4, 5 and 6, 7 and 8, and 9 and 10 are established in connection with the slip ratio ETR (of the torque converter) so that the membership functions of the slip ratio ETR complement each other. In order to prevent hunting, however, the membership function of the correction coefficient LFK of the conclusion is given hysteresis.

As driving conditions, rules 1 and 2 contemplate low vehicle speed and large slip ratio, rules 3 and 4 contemplate rather low vehicle speed and rather large slip ratio, rules 5 and 6 contemplate medium vehicle speed and medium slip ratio, rules 7 and 8 contemplate rather high vehicle speed and rather small slip ratio, and rules 9 and 10 contemplate high vehicle speed and small slip ratio. Since the basic duty value is set with respect to the throttle opening $\theta TH$, the membership function of the throttle opening is set at 1.0 over the whole throttle opening range, meaning that the throttle opening is not actually used in the fuzzy reasoning. It should be understood, however, that it can be set as desired if the necessity arises.

This fuzzy reasoning will now be explained with reference to the flowchart of FIG. 5. First, in S100 and S102, computation tables LHIGH and LAREA (explained later) are initialized to zero, whereafter the value of a counter LNRULE (which counts the number of rules) is initialized to zero in S104.

The program then advances to S106, in which the value of the rule counter LNRULE is incremented, to S108, in which the counter value is set to n (initial value 1), to S110, in which the value of the antecedent of rule n (in this case rule 1) is calculated, to S112, in which the value of the conclusion is calculated, and to S114, in which the value of the rule counter is compared with 10, whereafter S106 to S112 are looped until the counter value reaches 10 and all rules have been similarly processed.

Figure 12:
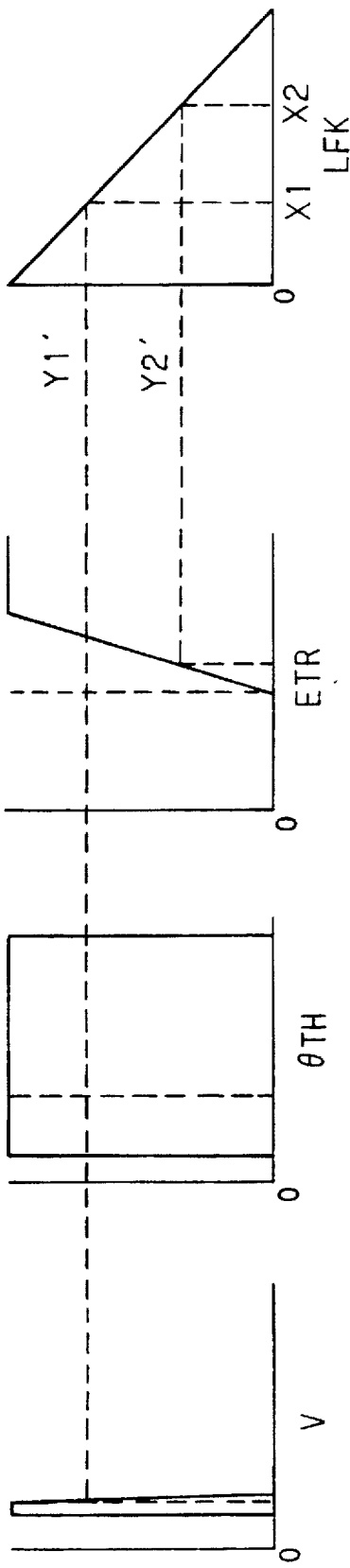
FIG. 12 is an explanatory view showing the fuzzy reasoning of FIG. 5.

The reasoning used is illustrated in FIG. 12. The minimum value among the three antecedent membership functions, the value of slip ratio ETR in the illustrated case, is used to determine the conclusion membership function grade (the height Yn' on the y-axis; corresponding to the aforesaid LHIGH) and the area LAREA is then calculated as shown in the figure. The y-axis height LHIGH of the conclusion and the area LAREA are calculated for each loop of the procedure up to S114 and the results are totaled. Then, in S116 and the following steps, the inferred value (the correction coefficient LFK) is calculated by dividing the total value of LAREA by the total value of LHIGH to obtain the center of gravity.

More specifically, the program advances to S116, in which it is checked whether the y-axis height LHIGH is zero and, when it is, to S118, in which correction coefficient LFK is set to zero to avoid division by zero. When the result in S116 is NO, the program goes to S120, in which the center of gravity is calculated as explained and the so-calculated value in the x-axis (universe of discourse) is defined as the correction coefficient. The program then goes to S122, in which it is checked whether the calculated correction coefficient LFK is in overflow and, when it is, to S124, in which the calculated correction coefficient LFK is rewritten to its upper limit of 1.0.

On the other hand, when the result in S122 is NO, the program goes to S126, in which the detected throttle opening θTH is used as address data to retrieve the basic duty value BDUTY from a table corresponding to the characteristic curve of FIG. 11 and then to S128, in which the retrieved basic duty value BDUTY is multiplied by the correction coefficient LFK obtained by fuzzy reasoning to thereby obtain the output duty value FBDY (corrected manipulated variable). This output duty value FBDY is then output to the solenoid SL4 by another routine not shown in the figures.

The foregoing is the control conducted in the region (d) of FIG. 4 when, owing to depression of the accelerator pedal or the like, the operating state moves across the line 2 from one in which the solenoids SL3 and SL4 are both ON and the lockup clutch is engaged. The prior art response to this situation is to turn the solenoid SL4 OFF at the point of crossing the line 2 and conducted only weak lockup control in the region β outside the hatched portion of the region (d).

As explained in the foregoing, however, in this invention the solenoid SL4 is kept on until the line 1 is crossed. As a result, an improvement in fuel economy is achieved owing to the increased engaging force in the region (d) (including both the hatched portion α and the region β outside the hatched portion, as defined earlier). In addition, since the degree of increase in the engaging force, i.e., the degree of increase in the duty value, is decided through fuzzy reasoning, the improvement in fuel economy can be achieved without giving rise to surging. Moreover, the drivability can be simultaneously improved in regard to direct control feel and the response of vehicle speed to accelerator pedal depression in the acceleration region.

In addition, the manipulated variable is obtained by correcting the basic manipulated variable by multiplying the correction coefficient obtained through fuzzy reasoning. It is thus easy to introduce the result of the fuzzy reasoning in the manipulated variable and to adjust the value with the manipulated variable obtained without conducting fuzzy reasoning, making the system configuration simple.

The foregoing describes the control when the operating state moves in the direction of the arrows $\underline{a}$ in FIG. 4.

Next, the control when the operation state moves in the direction of the arrows $\underline{c}$ in FIG. 4 will be explained, as a second embodiment of the invention.

This is the control conducted at the time of moving from the region (d) into the region (f), namely, at the time of shifting from engaging force control using fuzzy reasoning (i.e., control based on the corrected manipulated variable) to control with the lockup clutch inoperative.

One case in which this state arises is when the vehicle speed V decreases or the engine load increases (accelerator pedal depression). Another is when the technique taught by the assignee's earlier mentioned Japanese Laid-Open Patent Application No. Hei 6(1994)-109,122 (U.S. Pat. No. 5,317, 937) is adopted and an LC map other than one for level-road driving is selected. More specifically, control for increasing the engaging force by fuzzy reasoning is conducted only when the LC map for level-road driving is in use. If during driving in the region (d) using a map for level-road driving, the vehicle should begin hill-climbing or hill-descent, for example, the LC map is switched to the ordinary LC map for the D range. In the case of the ordinary LC map at this time, the hatched portion α of the region (d) is a region in which the lockup clutch is inoperative. The switching of the LC map thus causes a shift from engaging force control using fuzzy reasoning to control with the lockup clutch inoperative. In this embodiment, when a control shift occurs in either of these two ways and, in addition, the operating state stays in the region (f) without a gear shift (with the transmission kept in fourth gear), the output duty value is gradually reduced to prevent the shock that would be caused by suddenly disengaging the lockup clutch.

This control will now be explained with reference to the flowchart of FIG. 13. Like the routine of FIG. 3, this routine is also actuated at appropriate time intervals of, for example, 20 ms.

First, in S200, it is checked whether the operating state is in a lockup clutch disengaged region, namely, whether it is in the region (f). When the result is NO, the routine is immediately terminated. When it is YES, the program goes to S202, in which it is checked whether the operating state was in a fuzzy control region, i.e., the region (d), in the preceding cycle. If the result is NO, the routine is immediately terminated. If it is YES, the program goes to S204, in which it is checked whether gear shift has occurred. This check is made because if gear shift has occurred the lockup clutch has to be promptly disengaged in order to prevent an accompanying shock.

Figure 14:
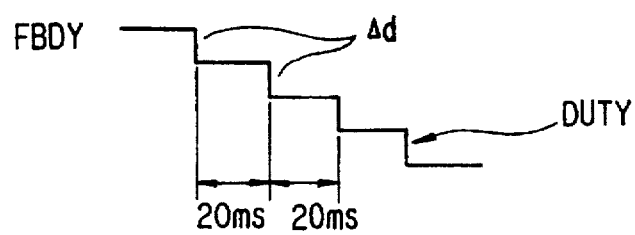
FIG. 14 is a timing chart explaining the operation of FIG. 13.

If the result in S204 is NO, the program goes to S206, in which it is checked whether the output duty value FBDY is zero. If the result is YES, this means that engaging force decrease control need not be conducted and the routine is immediately terminated. If the result is NO, the program goes to S208, in which a duty value reduction amount Delta $\underline{d}$ is calculated. The value of the reduction amount Delta $\underline{d}$ increases with increase in the slip ratio ETR of the torque converter or with the rate of change in the engine load (specifically the difference value Delta θTH in the detected throttle opening θTH between the preceding and current cycles). This relationship is established because of the need to rapidly disengage the lockup clutch to prevent shock when the slip ratio is large. The program then goes to S210, in which, as shown in FIG. 14, the calculated reduction amount Delta $\underline{d}$ is subtracted from the output duty value FBDY (corrected manipulated variable) and the value obtained is defined as output duty value DUTY. (This duty value is then output to the solenoid SL4 by another routine not shown in the figures.) The aforesaid processing is repeated until S206 finds that the output duty value FBDY has become zero.

Figure 13:
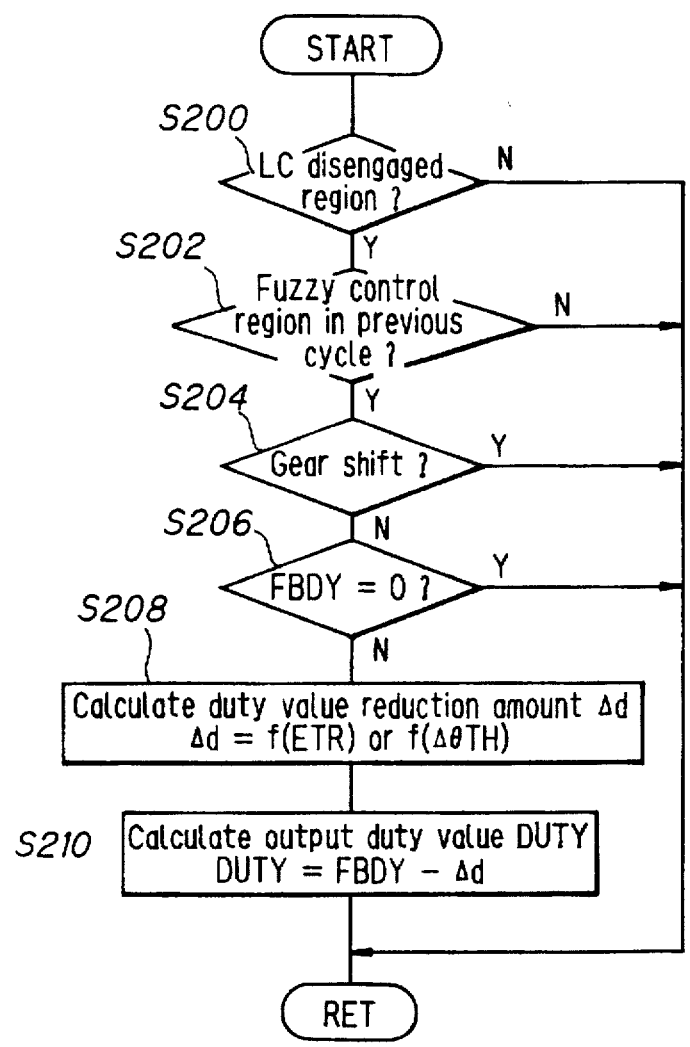
FIG. 13 is a flowchart showing another operation of the system according to a second embodiment of the invention.

This control according to the flowchart of FIG. 13 imparts an engaging force in the region (d) that is greater than the weak lockup and then enables a smooth, shock-free transition to the lockup clutch disengaged region (f).

An explanation will now be made regarding a third embodiment of the invention that relates to a separate auxiliary control, namely, to a control for increasing the engaging force by use of fuzzy reasoning when the operating state moves from the region (f) to the region (d) in FIG. 4. Since, as mentioned earlier, engaging force increase control using fuzzy reasoning is not conducted at the time of a direct shift from region (f) to the region (d), owing to control performance considerations, this control is, more precisely speaking, that in the case where the operating state moves from the region (f) through the region (d) to the region (c) and then immediately back to the region (d).

This control will now be explained with reference to the flowchart of FIG. 15. This routine is also actuated at appropriate time intervals of, for example, 20 ms.

First, in S300, it is checked whether the operating state is in a fuzzy control region, specifically, the region in which the corrected manipulated variable is used in the control, more specifically the region (d). If the result is NO, the routine is immediately terminated. If the result is YES, the program goes to S302, in which it is checked whether the elapsed time period T from the establishment of a lockup clutch operative state in which the control using fuzzy reasoning is not conducted, such as in the region (c), exceeds a prescribed time period T1. The reason for this is that owing to response delay of the hydraulic circuit, etc., of the lockup clutch the lockup clutch does not instantaneously follow the anticipated state when an output duty value is calculated by fuzzy reasoning and sent to the solenoid SL4 as a command.

Figure 16:
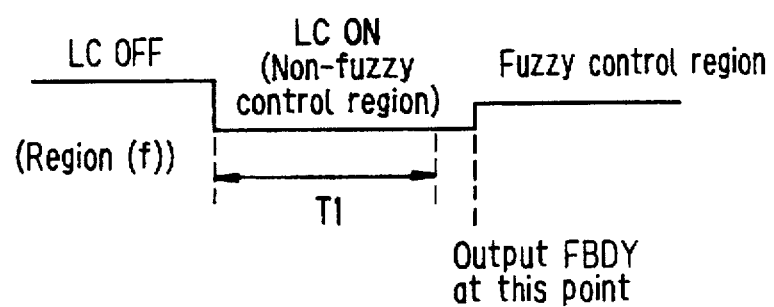
FIG. 16 is a timing chart explaining the operation of FIG. 15.

In other words, there is a risk that the feedback control of the engaging force based on the desired slip ratio will not be accurately conducted. If, for instance, the hydraulic circuit cannot actually follow a command to increase the engaging force, the engaging force will remain unchanged and engine revving may occur. If feedback control is conducted under this condition, the engaging force is increased even further, making it likely that the lockup clutch will suddenly engage and produce shock. In the case of moving from the inoperative (disengaged) state of the lockup clutch to the operative (engaged state) thereof (except in the region (d)), it is checked whether the time elapsed since entry into the region (c) is equal to or greater than the prescribed time period T1. (See FIG. 16.)

When the result in S302 is YES, the program goes to S304, in which it is checked whether the slip ratio ETR is between an upper limit value ETRH (110%, for example) and a lower limit value ETRL (80%, for example). This check is made to avoid inaccurate control and engine revving which may occur owing to the fact that the control performance is poor even after the elapse of the prescribed time period T1 if the slip ratio ETR of the torque converter is not in the prescribed range (80–110%). When the result in S304 is YES, since it can be concluded that the prescribed time period T1 has passed and the control performance is good, the program goes to S306, in which the output duty value FBDY calculated by fuzzy reasoning is defined as the output duty value DUTY.

On the other hand, if S302 finds that the prescribed time period T1 has not passed, the program goes to S308, in which a timer (down counter) T2 is set and started, to S310, in which it is checked whether a second time period T2 has passed, i.e., whether the time value has reached zero. Since the timer was just set in the preceding step, the result here is naturally NO and the program goes to S312, in which the output duty value DUTY is set to 0%.

The reason for setting the output duty value to 0% instead of to the duty value calculated just before crossing the line 3 in FIG. 4 is that if the duty value calculated just before crossing the line 3 should be output at the point of entering the fuzzy reasoning region, the duty value would thereafter actually be decreased to a lower value calculated by fuzzy reasoning. During rapid change of the throttle opening in the relatively low vehicle speed region where surging is a particular problem, the probability of surging occurrence is high when the duty value calculated just before crossing the line 3 is output.

In this embodiment, therefore, the duty value is first set to 0% and then gradually increased to the value calculated by fuzzy reasoning. Rather than setting the duty value to 0%, it is also possible when control response is a concern to set it to a low value smaller than the duty value calculated just before crossing the line 3.

Figure 15:
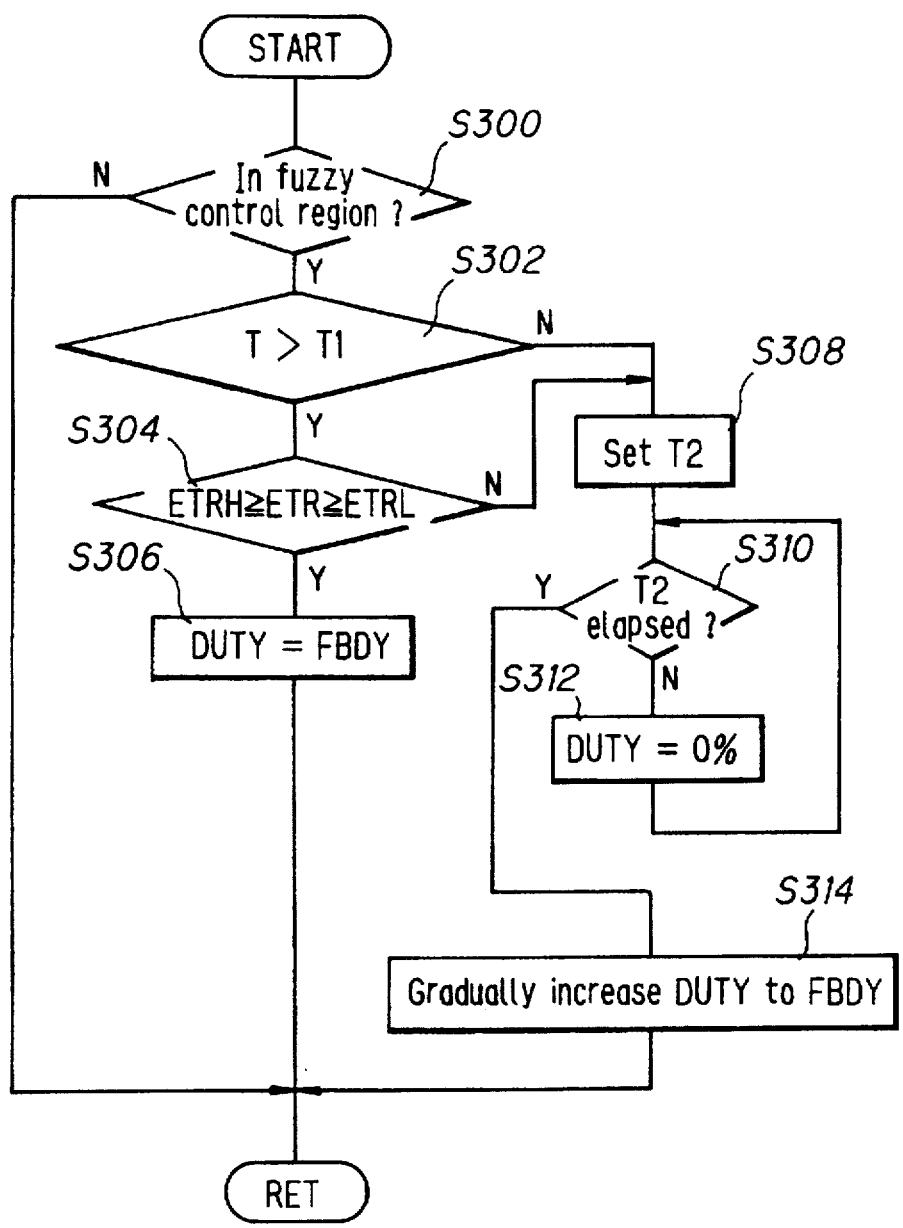
FIG. 15 is a flowchart showing still another operation of the system according to a third embodiment of the invention.

When S304 in FIG. 15 finds that the slip ratio ETR is not in the prescribed range, the program goes to S310 and if the result here is NO, the same processing as just described is conducted. Then when S310 finds that the time period T2 has passed, the program goes to S314, in which the duty value is gradually increased from 0% (or a low value) to the output duty value FBDY calculated by fuzzy reasoning.

Figure 17:
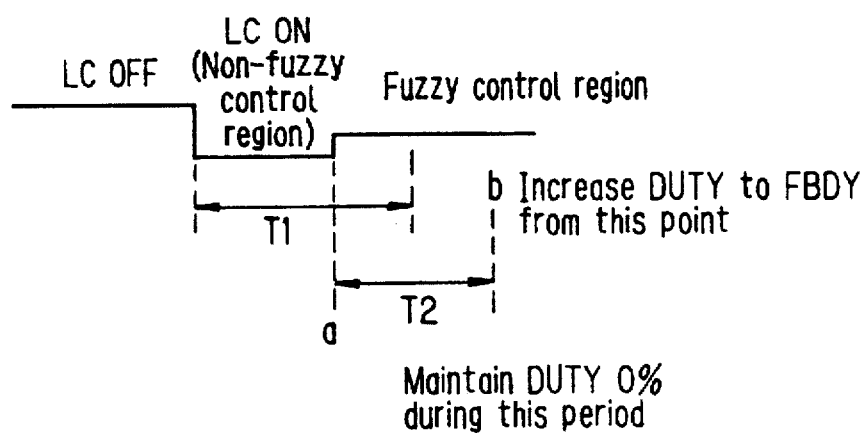
FIG. 17 is another timing chart similarly explaining the operation of FIG. 15.

In other words, as shown in FIG. 17, when the line 3 is crossed from the inoperative (disengaged) state of the lockup clutch before the first time period T1 has passed, or when a control performance degrades because the slip ratio is not in the prescribed range, the duty value of 0% (or a low value) is maintained for the second time period T2 and is thereafter gradually increased to the output duty value FBDY calculated by fuzzy reasoning. As a result, accurate feedback control can be achieved.

Since this embodiment is configured in the foregoing manner, the solenoid SL4 is not turned OFF until the line 1 is crossed. As a result, an engaging force greater than that of weak lockup conducted in the prior art is applied in the region (d), thereby enabling an improvement in fuel economy over the prior art.

In addition, since the degree of increase in the engaging force, i.e., the degree of increase in the duty value, is determined through fuzzy reasoning, the improvement in fuel economy can be achieved without giving rise to surging and thus without degrading drivability. To the contrary, the increase in engaging force improves the drivability by enhancing direct control feel and the response of vehicle speed to accelerator pedal depression in the acceleration region.

Further, since the duty value is gradually raised/decreased and the engaging force is gradually increased/decreased at movement from the fuzzy reasoning region (d) into the lockup clutch disengaged region (f) and at movement from the lockup clutch disengaged region (f) immediately into the fuzzy reasoning region (d) via the region (c) or the like, no sudden engagement/disengagement of the lockup clutch occurs. The transition can therefore be made smoothly without producing shock.

Moreover, at movement from the lockup clutch disengaged region (f) into the fuzzy reasoning region (d) via the region (c) or the like, a duty value calculated by fuzzy reasoning is used only after elapse of the time period T1 and when the slip ratio is within a predetermined range, and in other cases the duty value of 0% (or the low duty value) is held until the second time period T2 has passed and is thereafter gradually raised to the duty value calculated by fuzzy reasoning. As a result, problems such as engine revving do not occur. And since accurate feedback control is conducted, shock and other problems caused by sudden increase in engaging force are also nonexistent.

While the foregoing description assumes the slip state of the torque converter to be ascertained in terms of slip ratio, it can instead be ascertained in terms of slip amount.

While the invention has thus been shown and described with reference to the specific embodiments, it should be noted that the invention is in no way limited to the details of the described arrangements, and changes and modifications may be made without departing from the scope of the appended claims.

What is claimed is:

1. A system for controlling an automatic transmission of a vehicle, comprising:

hydraulic coupling means having an input connected to an internal combustion engine mounted on the vehicle and an output connected to a gear system in the transmission, said hydraulic coupling means passing engine power to the gear system;

gear ratio establishing means for establishing a gear ratio of the gear system in response to a gear shift command to transmit the engine power to a vehicle wheel through the established gear ratio;

a clutch for engaging/disengaging the input and the output of the hydraulic coupling means;

engaging force control means for controlling the engaging force of the clutch;

vehicle operating condition detecting means for detecting operating conditions of the vehicle; and basic manipulated variable determining means for determining a basic manipulated variable to be applied to said clutch in response to a parameter of the detected vehicular operating conditions in accordance with a predetermined characteristic set with respect to at least a parameter indicative of engine load;

wherein said engine force control means includes:

fuzzy reasoning means for carrying out fuzzy reasoning based on the detected operating conditions of the vehicle to determine a correction value of the basic manipulated variable;

manipulated variable correcting means for correcting the basic manipulated variable based on the correction value; and discriminating means for discriminating whether a control condition for engaging force control based on the corrected manipulated variable is met; and wherein said engaging force control means controls the engaging force of the clutch in response to the corrected manipulated variable, when the control condition is discriminated to be met.

2. A system according to claim 1, wherein the control condition is when the vehicle travels over level ground.

3. A system according to claim 1, wherein the control condition is when an auxiliary equipment that uses the engine power is in operation.

4. A system according to claim 1, wherein the control condition is when the established gear ratio is small.

5. A system according to claim 1, wherein said engaging force control means controls the engaging force of the clutch in response to the corrected manipulated variable when the control condition is discriminated to be met, if the vehicle is in a predetermined driving state.

6. A system according to claim 1, wherein said basic manipulated variable determining means determines the basic manipulated variable in response to the throttle opening.

7. A system according to claim 1, wherein said fuzzy reasoning means carries out fuzzy reasoning using at least one parameter among the throttle opening, vehicle speed and slip ratio of said hydraulic coupling means.

* * * * *